(12) United States Patent
Sohn et al.

(10) Patent No.: US 10,832,373 B2
(45) Date of Patent: Nov. 10, 2020

(54) ELECTRONIC DEVICE AND DATA PROCESSING METHOD THEREOF

(71) Applicant: SAMSUNG ELECTRONICS CO., LTD., Suwon-si (KR)

(72) Inventors: Ho-sik Sohn, Seoul (KR); Seung-ran Park, Hwaseong-si (KR); Seung-jin Baek, Suwon-si (KR); Ho-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 30 days.

(21) Appl. No.: 16/315,909

(22) PCT Filed: Mar. 8, 2017

(86) PCT No.: PCT/KR2017/002484
§ 371 (c)(1),
(2) Date: Jan. 7, 2019

(87) PCT Pub. No.: WO2018/008826
PCT Pub. Date: Jan. 11, 2018

(65) Prior Publication Data
US 2019/0304061 A1    Oct. 3, 2019

(30) Foreign Application Priority Data
Jul. 7, 2016   (KR) .................. 10-2016-0086206

(51) Int. Cl.
*G06T 5/00* (2006.01)
*G06T 3/40* (2006.01)
*G09G 3/20* (2006.01)

(52) U.S. Cl.
CPC ............ *G06T 3/40* (2013.01); *G06T 5/006* (2013.01); *G09G 3/20* (2013.01)

(58) Field of Classification Search
None
See application file for complete search history.

(56) References Cited

U.S. PATENT DOCUMENTS 6,188,385 B1   2/2001  Hill et al.
6,897,876 B2   5/2005  Murdoch et al.
(Continued)

FOREIGN PATENT DOCUMENTS

JP   2004-343194 A   12/2004
JP   2006-277172 A   10/2006
(Continued)

OTHER PUBLICATIONS

Search Report dated Jun. 27, 2017 by the International Searching Authority in International Patent Application No. PCT/KR2017/002484. (PCT/ISA/210).
(Continued)

*Primary Examiner* — Nicholas R Wilson
(74) *Attorney, Agent, or Firm* — Sughrue Mion, PLLC

(57) ABSTRACT

An electronic device providing image data processing and an image data processing method are provided. The electronic device comprises: a display; a reception unit for receiving an input image; and a processor which determines image characteristics of the input image, overlaps a pixel of the input image and a pixel of the display, creates a plurality of resampled images by changing the phase of the pixel of the input image on the basis of the characteristics of the display pixel, performs filtering on each of the plurality of resampled images on the basis of the characteristics of the image, and renders a corrected image on the display by creating the corrected image on the basis of the plurality of resampled images.

15 Claims, 9 Drawing Sheets

(56) References Cited

U.S. PATENT DOCUMENTS

| | | |
|---|---|---|
| 7,969,456 B2 | 6/2011 | Brown Elliott et al. |
| 8,326,050 B2 | 12/2012 | Au et al. |
| 8,933,959 B2 | 1/2015 | Brown Elliott et al. |
| 9,799,275 B2 | 10/2017 | Kim et al. |
| 2004/0032419 A1 | 2/2004 | Zhou et al. |
| 2004/0263528 A1 | 12/2004 | Murdoch et al. |
| 2008/0284763 A1 | 11/2008 | Someya et al. |
| 2015/0043015 A1* | 2/2015 | Warren ............... G06K 15/1856 358/1.2 |
| 2016/0171918 A1 | 6/2016 | Kim et al. |

FOREIGN PATENT DOCUMENTS

| | | |
|---|---|---|
| KR | 10-2004-0045926 A | 6/2004 |
| KR | 10-2009-0112698 A | 10/2009 |
| KR | 10-1041882 B1 | 6/2011 |
| KR | 10-2015-0020844 A | 2/2015 |
| KR | 10-2016-0072370 A | 6/2016 |
| WO | 03/036601 A2 | 5/2003 |
| WO | 2008/100826 A1 | 8/2008 |

OTHER PUBLICATIONS

Written Opinion dated Jun. 27, 2017 by the International Searching Authority in International Patent Application No. PCT/KR2017/002484. (PCT/ISA/237).

* cited by examiner

High Resolution
(Fine Pitch)

Low Resolution
(Coarse Pitch)

(a)

(b)

ELECTRONIC DEVICE AND DATA PROCESSING METHOD THEREOF

FIELD OF THE INVENTION

Devices and methods consistent with what is disclosed herein relate to an electronic device and a data processing method thereof, and more particularly, to an electronic device for multi-resampling an input image based on a pixel characteristic of a display and a characteristic of an image.

DESCRIPTION OF THE RELATED ART

Images are configured by rectangular grids of pixels having an evenly spaced size. Each rectangular grid may refer to data of an image included in each pixel. For example, each pixel represents R(Red), G(Green) and B(Blue) pixels. For another example, each pixel represents R(Red), G(Green), B(Blue) and W(White) pixels.

A resampling technique is a technique used for generating a new image by correcting an input image to a display having a width and/or height different from a pixel of an input image.

Conventionally, when resampling an image and rendering the resampled image to a display, the quality of the rendered image is deteriorated by the number of pixels of a display and the structure change of a sub-pixel. For example, when a high resolution image is converted into a low resolution image, a pitch between pixels of a display increases, and thus the rendered image is discontinued and distorted. For another example, when a RGB pixel structured image is converted into a RGBW pixel structured image, image quality is deteriorated by the structure change of a sub-pixel.

There, when resampling an input image and rendering the resampled image onto a display, a resampling method optimized for the number of pixels of a display and the structure change of a sub-pixel is required.

SUMMARY

One technical task of the present disclosure is to provide an electronic device for providing high-quality display rendering through multi-resampling an input image based on a pixel characteristic of a display and a characteristic of an image and performing a non-uniform resampling filter process on the resampled image in resampling an input image in an electronic device and rendering the resampled image onto a display, and a processing method thereof.

According to an exemplary embodiment, there is provided an electronic device for providing image data processing, including a display, a receiver configured to receive an input image, and a processor configured to determine an image characteristic of the input image, overlap a pixel of the input image with a pixel of the display, generate a plurality of resampling images by varying a phase of the pixel of the input image based on a display pixel characteristic, filter each of the plurality of resampling images based on the image characteristic of the input image, and generate a single corrected image based on the plurality of resampling images to render the single corrected image on the display.

According to the embodiments of the present disclosure, when an input image is resampled by an electronic device, and the resampled image is rendered on a display, by performing multi-resampling and non-uniform resampling filtering on an image based on a display pixel characteristic such as a pitch between pixels of a display and a distance between pixels of an image, it is possible to provide a high-resolution image in which the distortion of an image is reduced in the electronic device.

DETAILED DESCRIPTION OF EXEMPLARY EMBODIMENTS

Figure 1:
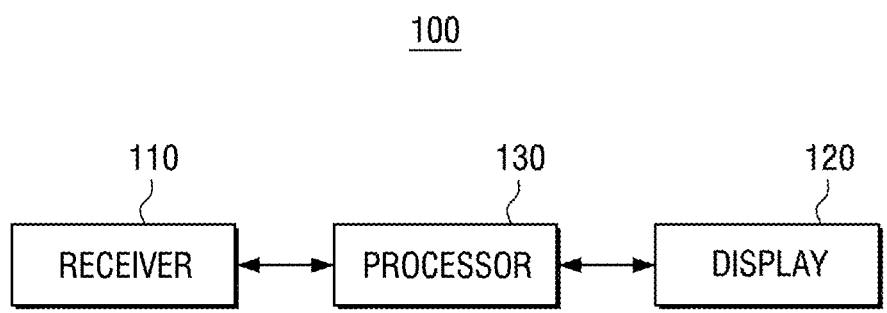
FIG. 1 is a schematic block diagram showing an electronic device according to an embodiment of the present disclosure.

The terms used in this specification will be briefly described, and the present disclosure will be described in detail.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

The invention is not limited to an embodiment disclosed below and may be implemented in various forms and the scope of the invention is not limited to the following embodiments. In addition, all changes or modifications derived from the meaning and scope of the claims and their equivalents should be construed as being included within the scope of the present disclosure. In the following description, the configuration which is publicly known but irrelevant to the gist of the present disclosure could be omitted.

The terms such as "first," "second," and so on may be used to describe a variety of elements, but the elements should not be limited by these terms. The terms are used simply to distinguish one element from other elements.

The singular expression also includes the plural meaning as long as it does not differently mean in the context. In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

In an exemplary embodiment, 'a unit', or 'a part' perform at least one function or operation, and may be realized as hardware, such as a processor or integrated circuit, software that is executed by a processor, or a combination thereof. In addition, a plurality of 'units', or a plurality of 'parts' may be integrated into at least one module or chip and may be realized as at least one processor except for 'units' or 'parts' that should be realized in a specific hardware.

Hereinafter, embodiments of the present disclosure will be described in detail with reference to the accompanying drawings so that those skilled in the art can easily carry out the present invention. However, the present disclosure may be embodied in many different forms and is not limited to the embodiments described herein. In order to clearly illustrate the present disclosure in the drawings, some of the elements that are not essential to the complete understanding of the disclosure are omitted for clarity, and like reference numerals refer to like elements throughout the specification.

FIG. 1 is a schematic block diagram showing an electronic device according to an embodiment of the present disclosure.

Referring to FIG. 1, an electronic device 100 may include a receiver 110, a display 120, and a processor 130. The block diagram showing the electronic device 100 is an example embodiment to explain the present disclosure, but it is not limited thereto.

The electronic device 100 may be various types of display devices capable of displaying images. For example, the electronic device 100 may be mobile phones, tablet PCs, laptops, televisions, smartphones, smart watches, etc. The above-described examples are only for explaining the present disclosure, but it is not limited thereto.

The receiver 110 may receive an image to be rendered on a display from an external source. The receiver 110 may receive an image by user selection so that the image stored in the electronic device 100 is to be rendered onto the display 120. The expression "the received image" may indicate "the input image".

The display 120 may be embodied as various displays such as LCD, TFT-LCD, OLED, PDP, flexible display, three-dimensional display, etc. The display 120 may display an image to be displayed by the electronic device 100.

The processor 130 may determine the image characteristic of the input image received at the receiver 110. The processor 130 may overlap a pixel of the input image with a pixel of the display 120 to be displayed on the display 120, vary the phase of the pixel of the input image based on the pixel characteristic of the display 120, and generate a plurality of resampling images. The processor 130 may perform sampling filtering of the respective plurality of generated resampling images based on the characteristic of an image.

For example, the input image may be a square grid consisting of M*N matrix pixels and the display 120 may be a square grid of m*n matrix pixels where M is greater than or equal to m, and N is greater than or equal to n. The total size of the square grid formed of the M*N matrix may be equal to the total size of the square grid formed of the m*n matrix.

Therefore, when the M*N matrix pixels and the m*n matrix pixels of the input image overlap, the pixels constituting the M*N matrix may be overlapped on the m*n matrix. The processor 130 may determine a resampling region of the overlapped pixel region. The detailed description thereof will be made below with reference to FIG. 7 and FIG. 8.

The processor 130 may determine a non-uniform resampling region based on the image characteristic of the input image and the pixel characteristic of the display 120.

For example, the image characteristic of the input image may be a gradient magnitude and a similarity of pixels at the center of the resampling region and peripheral pixels of the resampling region. In addition, the pixel characteristic of the display 120 may be a pitch between pixels included in the display 120 and the light emission amount. However, it is an example embodiment to explain the present disclosure, but other characteristics may be further included as the image characteristic and the display pixel characteristic.

The processor 130 may determine a blur region periodically generated in the resampling region based on the pitch between pixels included in the display 120, and the pixel position (the position of grid) including the pixel of the input image.

The processor 130 may determine the position of the grid line of the input image pixel so that the grid line of the input image pixel may not be positioned in the blur region of the display 120.

The processor 130 may generate a plurality of resampling images on each phase by varying the phase of the input images in up, down, left, right and diagonal directions.

The processor 130 may merge the plurality of resampling images based on the gradient according of the phase of each of the plurality of resampling images and generate a corrected image to be rendered on the display 120.

The processor 130 may determine a final output pixel by multiplying weight values depending on the size of the region where the pixel of the input image overlaps the pixel of the display 120 in the resampling region, and the number of overlapped pixels in the overlapped region.

The processor 130 may determine a resampling filter coefficient based on the image characteristic of the input image and the pixel information of the display 120.

The processor 130 may generate a single corrected image based on the plurality of resampling images and render the corrected image on the display 120.

Figure 2:
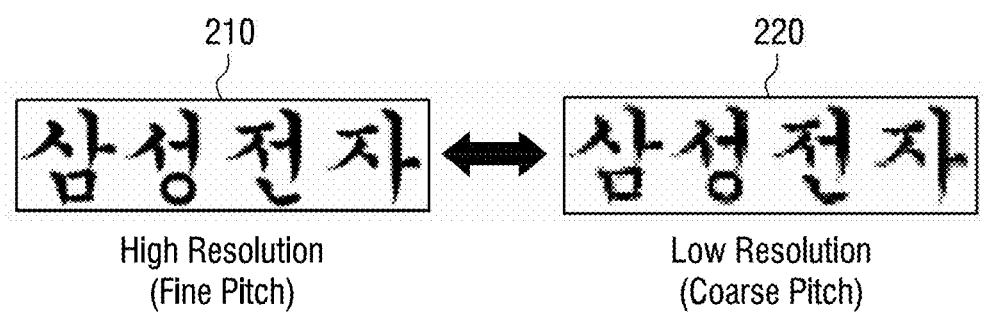
FIG. 2 is a view to explain a conventional technique.

FIG. 2 is a view to explain a conventional technique.

Referring to FIG. 2, when an input image is resampled and rendered on a high resolution display, a high resolution display 210 may have the smaller number of deteriorated pixels according to a pitch between pixels of a display. Therefore, the high resolution image 210 may have a fine pitch. However, when the input image is resampled and rendered on a low resolution display, the low resolution display 220 may have a distortion, for example, an image is discontinued by the coarse pitch as the pitch between pixels of the display increases. Therefore, the image quality may be deteriorated by the physical characteristic of the pixel such as the pitch between pixels of the display for displaying the input image.

Figure 3:
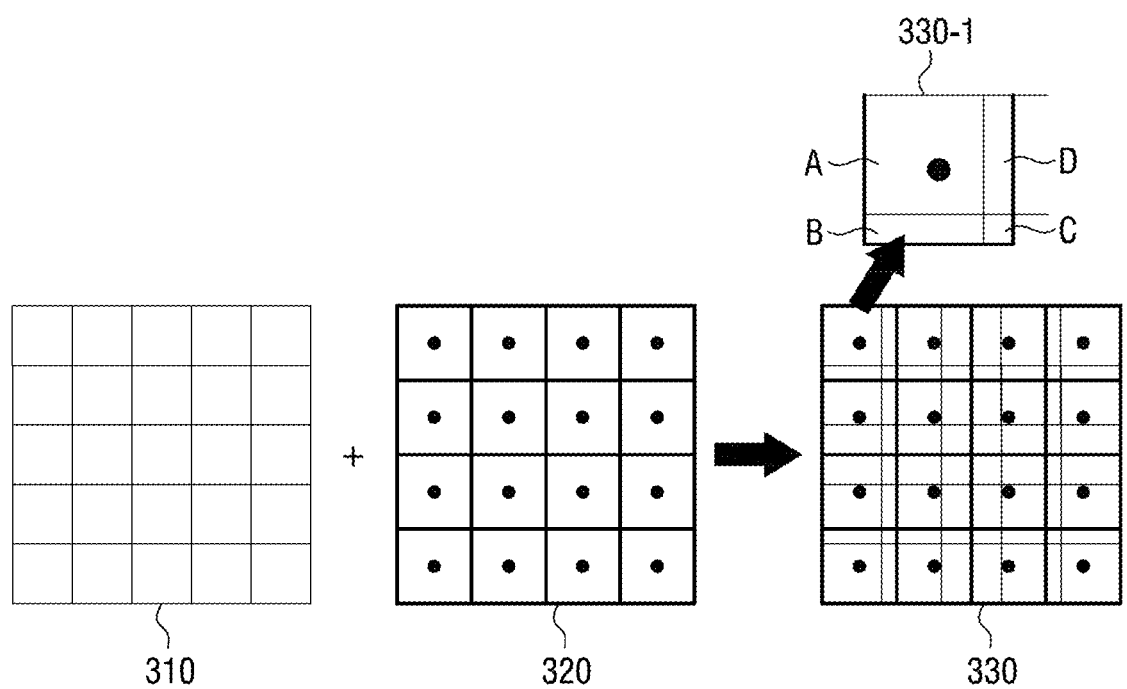
FIGS. 3 and 4 are views to explain a conventional resampling method for an image.
Figure 4:
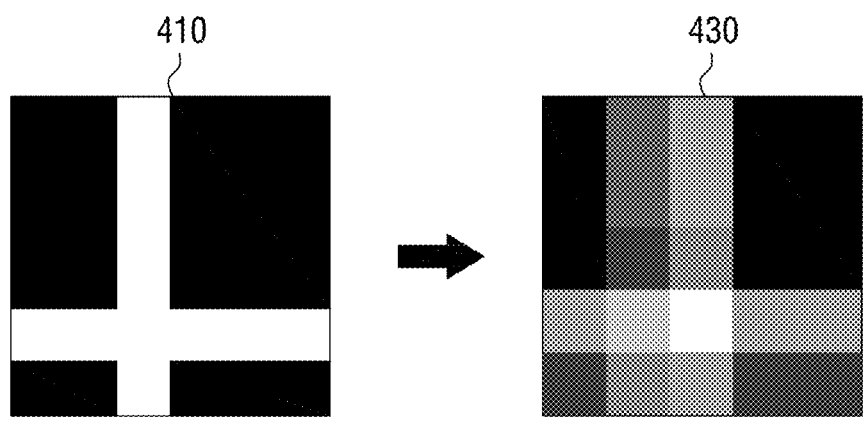

FIGS. 3 and 4 are views to explain a conventional resampling method for an image.

Referring to FIG. 3, an input image 310 may be an image expressed by a rectangular image having the same pixel size. For example, the input image 310 may be expressed by a pixel of 5*5 matrix. An image 320 displayed in the display 120 of the electronic device 100 may be an image expressed by a rectangular grid having a 4*4 pixel size. Therefore, the input image 310 may have a different pixel structure from the display image 320. In this case, a resampling process may be required to correct the input image 310 to an image suitable for the display pixel structure of the electronic device 100.

A conventional resampling method comprises overlapping the input image 310 with the resampling region 320 and performing a uniform resampling filtering process on an overlapped pixel 330. Therefore, the overlapped pixel 330 and a coarse pitch resampling region 330-1 to be resampled may have the same size. The black point of each pixel of the display image 320 may indicate the center of resampling as a display pixel. The resampling region 330-1 may define an image where the input image 310 and the display 320 do not overlap with each other based on the center of resampling as a resampling region. A pixel value may be sampled by giving different weight values to resampling region A and regions A, B, C and D where the input image 310 overlaps the display image 320. A pixel value may be sampled by applying different weight values according to the areas of regions A, B, C and D where the input image 310 overlaps with the display image 320. In other words, according to the conventional resampling method, the input image 310 may overlap the display 320 in a fixed position, and the resampling region 330-1 may be determined as a designated size in the resampling image 330. Hereinafter, a conventional resampling method will be described as a uniform resampling method.

FIG. 4 is a view illustrating a resampling image 430 generated by resampling an input image 410 by using a conventional uniform resampling method. Referring to FIG. 4, the resolution may be deteriorated in a white section of an input image due to resampling. In addition, the definition may be degraded by resampling to a gray color in a black section of an input image.

Figure 5:
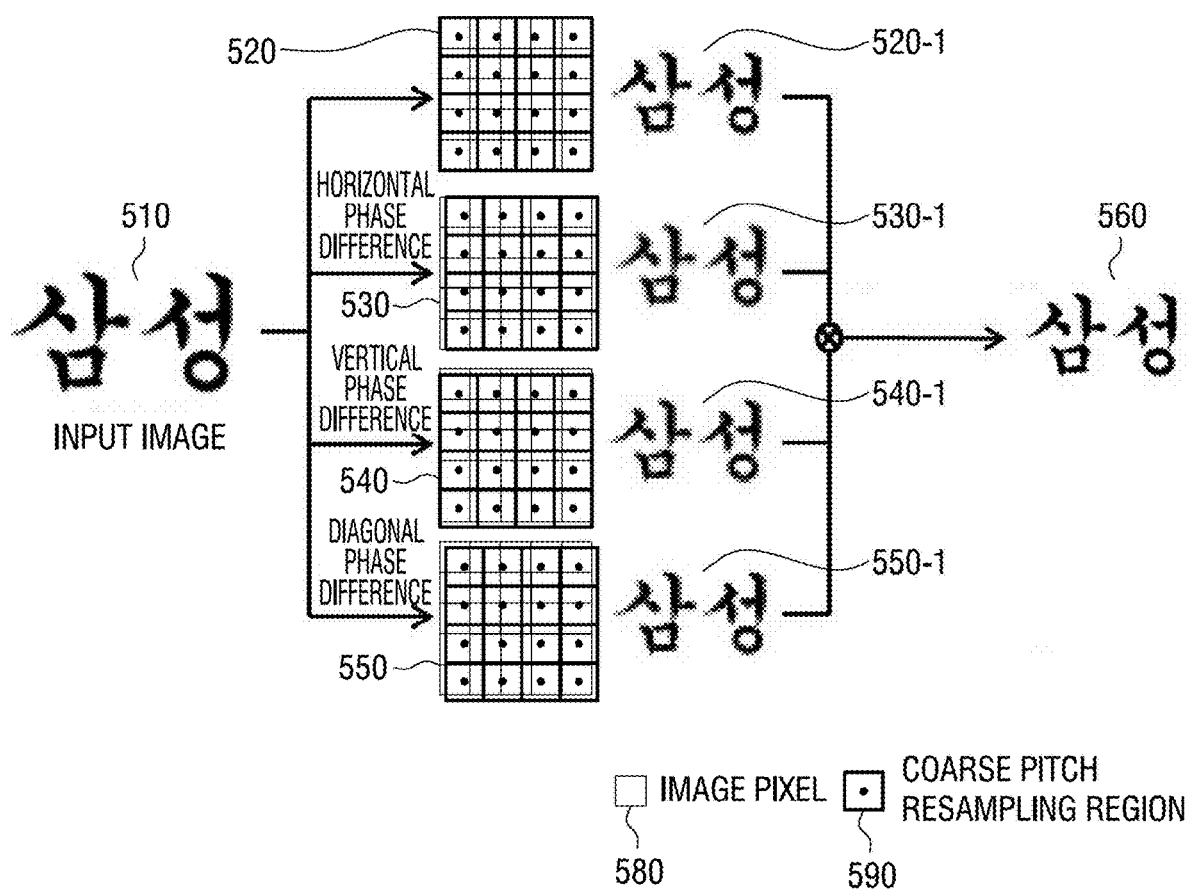
FIG. 5 is a view to explain a resampling method for an input image according to an embodiment of the present disclosure.

FIG. 5 is a view to explain a resampling method for an input image according to an embodiment of the present disclosure. FIG. 5 will be explained based on the input image 310 having the 5*5 matrix pixel structure, and the display image 320 having the 4*4 matrix pixel structure. A rectangular 580 in a thin line shown in FIG. 5 may represent a pixel of an input image and a rectangular 590 in a thick line may represent a coarse pitch resampling region.

Referring to FIG. 5, an input image 510 may be resampled to be corrected to an image suitable for a pixel structure of a display. The input image 510 may overlap the display image 320 shown in FIG. 3 and generate a plurality of resampling images 520, 530, 540 and 550 forming a resampling region. Referring to FIG. 4, the resampling region of the resampling image 520 may be obtained by uniformly resampling the input image 510 to the pixel structure of the display.

According to an embodiment of the present disclosure, the input image 510 may generate a plurality of resampling images 530, 540 and 550 by varying the phase on the display image 520 based on the physical characteristic of a pixel of a display and an image such as a pitch between pixels. For example, as the pixel pitch of the display increases, the phase shift of the input image may increase.

The resampling images 530, 540 and 550 may generate the input image 510 with a phase shift in a horizontal direction, a vertical direction, or a diagonal direction. Therefore, a resampling region of the first pixel of the same images 520, 530, 540 and 550 expressed by a grid, where the input image does not overlap the display image based on the center of resampling, may have a different region in the same pixel.

A plurality of images 520-1, 530-1, 540-1 and 550-1 having different definitions may be generated from the resampling images 520, 530, 540 and 550, respectively, through a resampling filter. According to an embodiment of the present disclosure, the plurality of resampling images 520, 530, 540 and 550 may generate the plurality of images 520-1, 530-1, 540-1 and 550-1 through resampling filters respectively corresponding thereto. For example, a resampling filter may be a non-uniform region based filter such as a Low Path Filter (LPF). The LPF is an example embodiment to explain the present disclosure, but is not limited thereto. Other non-uniform region based digital filters may also be used. A resampling filter according to an embodiment of the present disclosure will be described with reference to FIGS. 7 to 9.

According to an embodiment of the present disclosure, the plurality of images 520-1, 530-1, 540-1 and 550-1 may be merged based on the pixel gradient of the input image 510 to generate a single correction image 560 and render the correction image 560 on the display of the electronic device 100. The gradient may be used to identify how close the pixel is to the edge of the image or the direction of the edge, depending on the magnitude and the direction of the gradient at each pixel location of the image.

FIG. 5 explains a method for generating four different resampling regions in the same pixel through a resampling image with a horizontal phase shift to the left 530, a resampling image with a vertical phase shift to the upper side 540, and a resampling image with a phase shift to the left diagonal direction 550.

However, with a phase shift in up, down, left and right directions and diagonal directions to an input image, 9 (nine) different resampling regions may be generated in the same pixel. The phase shift of the input image may be embodied in various manners.

Figure 6:
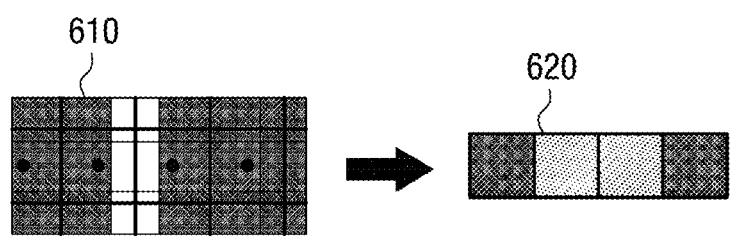
FIG. 6 is a view for comparing a conventional resampling method with a resampling method of the present disclosure according to an embodiment of the present disclosure.
Figure 6:
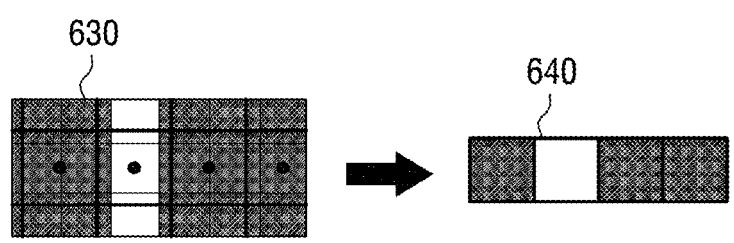

FIG. 6 is a view for comparing a conventional resampling method with a resampling method of the present disclosure according to an embodiment of the present disclosure.

Part (a) of FIG. 6 illustrates a resampling region 610 generated by a conventional uniform resampling method, and a resampling image 620 generated by resampling an input image in the resampling region 610. However, part (b) of FIG. 6 illustrates a resampling region 630 generated by a multiple resampling method according to the phase difference of the input image shown in FIG. 5, and a resampling image 640 generated by resampling the input image in the resampling region 630.

With respect the resampling region 610 and the resampling region 630 according to an embodiment of the present disclosure, the white region of the resampling region 610 may not include a resampling center (a black point), and can be excluded from the resampling region. In addition, a grid line forming a display pixel may be disposed at the center of the white region of the resampling region 610. Therefore, a distortion may occur in the resampling image 620 due to the structure difference between the pixel of the input image and the pixel of the display (pixel size, pixel pitch, pixel arrangement, light emission amount, etc.).

The grid line of the input image may be arranged in the resampling region 630 so that the resampling center (the black point) may be disposed in the white region of the resampling region 630. Therefore, a resampling region in which the input image pixel does not overlap the display pixel may be generated based on the resampling center. Therefore, according to an embodiment of the present disclosure, in the white region of the image, the high resolution image may be obtained from the resampling image 640 where distortion is lower than the resampling image 620 by a conventional resampling method.

Referring to FIG. 5, the resampling center of the display pixel may be embodied to cover the overall resampling region of the image by shifting the phase of the input image in up, down, left and right directions and/or in a diagonal direction. The phase shift of the input image may be determined based on the physical characteristic of the display pixel such as the pixel pitch between pixels of the display, the pixel arrangement of the display, the light emission amount, etc. For example, as the pixel between pixels of the display increases, the phase difference of the input image may increase.

Figure 7:
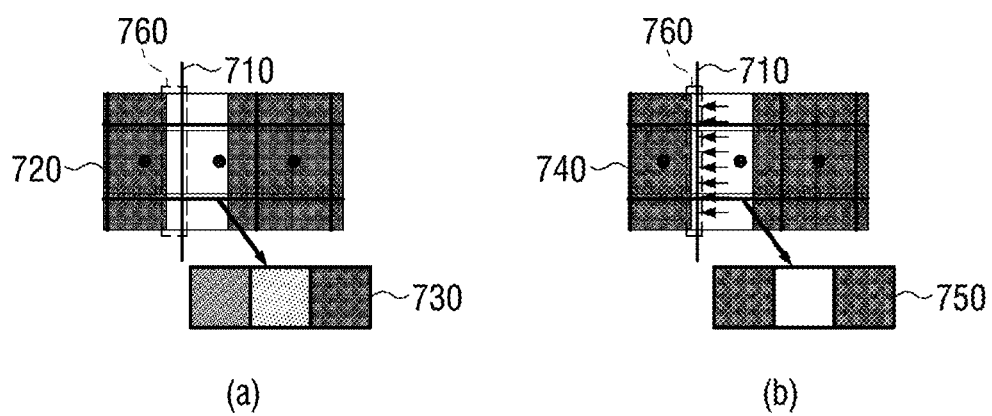
FIGS. 7 and 8 are views to explain a non-uniform resampling filter according to an embodiment of the present disclosure.
Figure 8:
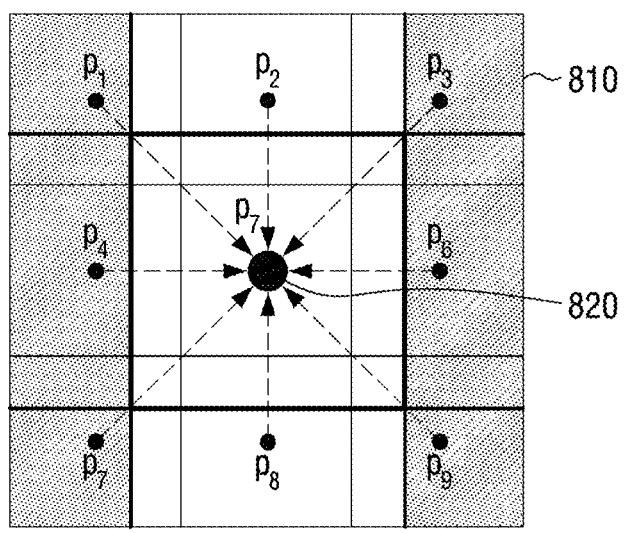

FIGS. 7 and 8 are views to explain a non-uniform resampling filter according to an embodiment of the present disclosure.

FIG. 7 illustrates a method for determining a resampling region by varying the pixel position of the display and the pixel position of the input image according to an embodiment of the present disclosure.

According to an embodiment of the present disclosure, the electronic device 100 may determine a non-uniform resampling region based on the characteristic of the input image and the pixel characteristic of the display.

Referring to FIGS. 5 and 6, according to an embodiment of the present disclosure, the electronic device 100 may generate a multiple resampling image by shifting the phase of the input image based on the pixel characteristic of the display.

The electronic device 100 may determine a blur region periodically generated in the resampling region based on the pitch between pixels included in the display, and determine the position of the pixel grid of the input image.

For example, when the phase of the input image is shifted by the electronic device 100, a resampling region 720 may periodically include a region 760 (a blur region) not including the resampling center (the black point) depending on the pixel position of the input image and the pixel position of the display.

Therefore, a resampling image 730 including the distortion of the image may be generated in the blur region 760 during the sampling by using a multiple resampling method according to the phase difference of the input image according to an embodiment of the present disclosure.

The electronic device 100 may determine the pixel characteristic of the input image and the pixel characteristic of the display (pixel pitch, pixel position, etc.) in the blur region 760 generated by resampling the input image.

The electronic device 100 may determine the position of the pixel grid line 710 to be disposed through the phase shift of the input image. The pixel grid line 710 may be a pixel grid line of the input image, or a pixel grid line of the display.

The electronic device 100 may determine the position of the grid line so that the pixel grid line may not be disposed in the blur region.

Referring to part (b) of FIG. 7, the electronic device 100 may vary the position of the pixel grid line 710 so that the blur region may not be generated in the resampling region 740. Therefore, according to an embodiment of the present disclosure, a resampling region 750 with the reduced distortion of the image in the blur region 760 may be generated in the resampling region 740 than in the resampling image 730 before the position of the pixel grid line 710 is changed.

FIG. 8 is a view to resampling a method for determining a resampling filter coefficient in the electronic device 100 according to an embodiment of the present disclosure.

According to an embodiment of the present disclosure, a resampling filter coefficient may be determined based on the display pixel characteristic and the image characteristic.

For example, the display pixel characteristic may be the pixel pitch between pixels of a display or the light emission amount. The image characteristic may be the magnitudes of the image pixel at the center of the resampling region and neighboring gradient. In addition, the image characteristic may be the similarity between the image pixel at the center of the resampling region and the neighboring gradient.

For example, the image characteristic may be the gradient magnitudes of pixel p7 including a resampling center (a block point) and neighboring overlapped pixels p1, p2, p3, p4, p5, p6 and p8, or the gradient similarity between the center pixel P7 and the overlapped pixels p1, p2, p3, p4, p5, p6 and p8.

In addition, according to an embodiment of the present disclosure, the electronic device 100 may determine a final output pixel by multiplying each overlapped pixel by a different weight value based on the size of the region where the pixel of the input image overlaps the pixel of the display in the resampling region and the number of overlapped pixels in the overlapped region.

For example, the display pixel (bold rectangular) including the resampling center (the black point) may overlap the peripheral input image pixels p1, p2, p3, p4, p5, p6, p7 and p8 in different sizes. The electronic device 100 may obtain a final output pixel value by adding all of pixel values w1*p1, w2*p2, w3*p3, w4*p4, w5*p5, w6*p6, w7*p7 and w8*p8 obtained by applying a different weight value to each of the overlapped pixels p1, p2, p3, p4, p5, p6, p7 and p8 depending on the size of the overlapped area.

A final output pixel value L may be obtained by formula $$Ln = \sum_{n=0}^{N} wn * Pn$$

where n is the number of overlapping pixels, w is the weight, and P may is the pixel data for the overlapping magnitudes in the overlapping pixels.

According to an embodiment of the present disclosure, a filter coefficient may be determined based on the display pixel characteristic and the image characteristic by using a non-uniform digital filter such as a low path filter (LPF), etc. The LPF is only the example to explain the present disclosure, but it is not limited thereto.

Figure 9:
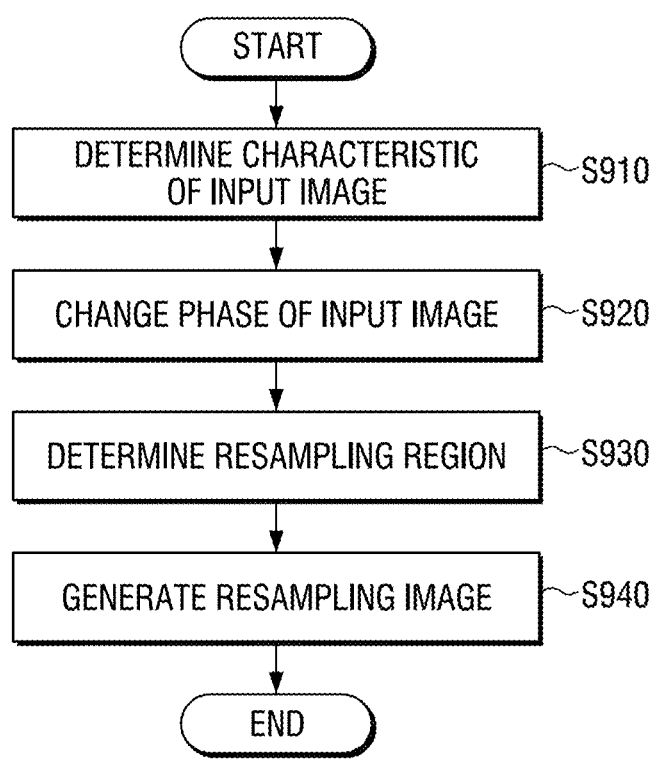
FIG. 9 is a flowchart to explain resampling of an image according to an embodiment of the present disclosure.

FIG. 9 is a flowchart to explain resampling of an image according to an embodiment of the present disclosure.

At step S910, the electronic device 100 may receive the input image and determine the image characteristic of the input image. The image characteristic of the input image may be the gradient magnitude and the gradient similarity between the pixel at the center of the resampling region and the pixel near the resampling region when the input image is resampled appropriately for the display pixel.

At step S920, the electronic device 100 may vary the pixel phase of the input image based on the physical characteristic of the pixel such as a pixel pitch between pixels of a display. The electronic device 100 may vary the resampling region by shifting the pixel chase of the input image in up, down, left and right directions or in a diagonal direction based on the pixel pitch of the display. For example, as the display pixel pitch increases, the phase difference of the input image may be large.

At step S930, the electronic device 100 may determine a resampling region. The electronic device 100 may determine a blur region periodically generated through the phase shift of the input image in the resampling region. The electronic device 100 may determine the positions of the display pixel to be disposed in the blur region in the resampling region and the pixel grid line. The electronic device 100 may move the grid line so that the display pixel and the pixel grid line of the input image may not be disposed in the blur region.

At step S940, the electronic device 10 may perform filtering of a plurality of resampling images generated by performing multiple-resampling of an input image, and merge the filtered images into a single corrected image.

Therefore, according to an embodiment of the present disclosure, the electronic device 100 may perform multiple resampling according to the phase shift of the input image based on the pixel structure, and minimize the blur region when resampling the input image to generate a high resolution image.

The methods according to exemplary embodiments of the present disclosure may be implemented in the form of program commands that can be executed through various computer means and recorded in a computer-readable medium. The computer-readable medium may include program commands, data files, data structures, and the like, alone or in combination. For example, the computer-readable medium may be volatile storage or non-volatile storage such as ROM regardless of whether it is erasable or rewritable, a memory such as RAM, memory chip, device and integrated circuit, or a storage medium readable by a machine (e.g., a computer) as well as being optically or magnetically recordable such as CD, DVD, magnetic disk or magnetic tape.

It should be understood that the memory that is included within the electronic device 100 is an example of programs containing commands for embodying embodiments of the present disclosure or a machine-readable storage medium suitable for storing programs. The program commands recorded on the medium may be those specially designed and configured for the present disclosure or may be available to those skilled in the art of computer software.

Although exemplary embodiments have been shown and described, it will be appreciated by those skilled in the art that changes may be made to these exemplary embodiments without departing from the principles and spirit of the present disclosure. Accordingly, the scope of the present disclosure is not construed as being limited to the described exemplary embodiments, but is defined by the appended claims as well as equivalents thereto.

DRAWINGS

FIG. 1
110 RECEIVER
120 DISPLAY
130 PROCESSOR
FIG. 2
210 SAMSUNG ELECTRONICS
220 SAMSUNG ELECTRONICS
FIG. 5
510 SAMSUNG INPUT IMAGE
520-1 SAMSUNG
530 HORIZONTAL PHASE DIFFERENCE
530-1 SAMSUNG
540 VERTICAL PHASE DIFFERENCE
540-1 SAMSUNG
550 DIAGONAL PHASE DIFFERENCE
550-1 SAMSUNG
560 SAMSUNG
580 IMAGE PIXEL
590 COARSE PITCH RESAMPLING REGION
FIG. 9
START
S910 DETERMINE CHARACTERISTIC OF INPUT IMAGE
S920 CHANGE PHASE OF INPUT IMAGE
S930 DETERMINE RESAMPLING REGION
S940 GENERATE RESAMPLING IMAGE
END

What is claimed is:

1. An electronic device for providing image data processing, comprising:
a display;
a receiver configured to receive an input image; and
a processor configured to determine an image characteristic of the input image, overlap a pixel of the input image with a pixel of the display, generate a plurality of resampling images by varying a phase of the pixel of the input image based on a display pixel characteristic, filter each of the plurality of resampling images based on the image characteristic of the input image, and generate a single corrected image based on the plurality of resampling images to render the single corrected image on the display.

2. The electronic device as claimed in claim 1, wherein the processor is further configured to determine a non-uniform resampling region based on the image characteristic and the display pixel characteristic.

3. The electronic device as claimed in claim 2, wherein the processor is further configured to determine a blur region periodically generated in the resampling region based on a pixel pitch between pixels included in the display, and determine a position of a grid including a pixel of the input image.

4. The electronic device as claimed in claim 3, wherein the processor is further configured to determine a position of a grid line and the grid line is not disposed in the blur region.

5. The electronic device as claimed in claim 1, wherein the processor is further configured to generate the plurality of resampling images on respective phases by varying a phase of the input image in up, down, left, right, and diagonal directions.

6. The electronic device as claimed in claim 2, wherein the processor is further configured to merge the plurality of resampling images into the corrected image based on a gradient according to a phase of each of the plurality of resampling images.

7. The electronic device as claimed in claim 6, wherein the processor is further configured to determine a final output pixel by applying a weight value according to a size of a region where the pixel of the input image overlaps the pixel of the display in the resampling region and a number of overlapped pixels in the overlapped region.

8. The electronic device as claimed in claim 2, wherein the image characteristic is a gradient magnitude and a similarity of a pixel at a center of the resampling region and a pixel near the resampling region, and
wherein the display pixel characteristic is a pitch between pixels included in the display and a light emission amount.

9. The electronic device as claimed in claim 1, wherein the input image is formed of an M*N matrix pixel, and
wherein the display is formed of an m*n matrix pixel, where M is equal to or greater than m, and N is equal to or greater than n.

10. The electronic device as claimed in claim 1, wherein the processor is further configured to determine a resampling filter coefficient based on the image characteristic and the display pixel characteristic.

11. A method for processing image data of an electronic device, the method comprising:
receiving an input image;
determining an image characteristic of the input image;

overlapping a pixel of the input image with a pixel of a display of the electronic device, and generating a plurality of resampling images by varying a phase of the pixel of the input image according to the image characteristic of the input image;

filtering each of the plurality of resampling images based on the image characteristic of the input image and a display pixel characteristic; and generating a single corrected image based on the plurality of resampling images and rendering the single corrected image on the display.

12. The method as claimed in claim 11, wherein the generating of the plurality of resampling images comprises determining a non-uniform resampling region based on the image characteristic and the display pixel characteristic.

13. The method as claimed in claim 12, wherein the determining of the resampling region further comprises:

determining a blur region periodically generated in the resampling region based on a pixel pitch between pixels included in the display; and determining a position of a grid including a pixel of the input image.

14. The method as claimed in claim 13, further comprising:

determining a position of a grid line and the grid line is not disposed in the blur region.

15. The method as claimed in claim 11, wherein the generating of the plurality of resampling images comprises generating a resampling image on each phase by varying a phase of the input image in up, down, left, right, and diagonal directions.

* * * * *